United States Patent
Kudoh

(10) Patent No.: US 9,739,981 B2
(45) Date of Patent: Aug. 22, 2017

(54) ZOOM-TYPE LENS BARREL AND IMAGE PICKUP APPARATUS

(71) Applicant: CANON KABUSHIKI KAISHA, Tokyo (JP)

(72) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/252,380

(22) Filed: Apr. 14, 2014

(65) Prior Publication Data

US 2014/0307331 A1    Oct. 16, 2014

(30) Foreign Application Priority Data

Apr. 15, 2013 (JP) ................................. 2013-084761

(51) Int. Cl.
| | |
|---|---|
| G02B 15/14 | (2006.01) |
| G02B 7/02 | (2006.01) |
| H04N 5/262 | (2006.01) |
| G02B 13/00 | (2006.01) |
| G02B 7/10 | (2006.01) |

(52) U.S. Cl.
CPC .......... G02B 13/009 (2013.01); G02B 7/102 (2013.01)

(58) Field of Classification Search
CPC .......... G02B 7/10; G02B 7/102; G02B 7/021; G02C 7/08; H04N 5/23296; G11B 7/0932; G11B 7/0935
USPC ..... 359/699–701, 694, 811–830; 396/76, 79; 348/240.99–240.3
See application file for complete search history.

(56) References Cited

U.S. PATENT DOCUMENTS

| | | | |
|---|---|---|---|
| 5,082,360 A * | 1/1992 | Sato | G02B 15/167 |
| | | | 359/675 |
| 2006/0034001 A1* | 2/2006 | Nagai et al. | 359/694 |
| 2006/0115251 A1* | 6/2006 | Nomura | 396/55 |
| 2007/0177865 A1* | 8/2007 | Nomura | G03B 17/04 |
| | | | 396/349 |

FOREIGN PATENT DOCUMENTS

| | | |
|---|---|---|
| JP | 2005-284247 A | 10/2005 |
| JP | 2007-206238 A | 8/2007 |
| JP | 2007-212630 A | 8/2007 |
| JP | 2008-046504 A | 2/2008 |
| JP | 2010-026163 A | 2/2010 |
| JP | 2011-013641 A | 1/2011 |
| JP | 2011-053654 A | 3/2011 |
| JP | 2012-058354 A | 3/2012 |

* cited by examiner

*Primary Examiner* — Dawayne A Pinkney
(74) *Attorney, Agent, or Firm* — Cowan, Liebowitz & Latman, P.C.

(57) ABSTRACT

A lens barrel which is capable of increasing zoom rate and slimming down a lens barrel, and by extension an image pickup apparatus while reducing the size of the lens barrel in a radial direction without decreasing the lens diameter of a retractable lens which retracts outwardly in a radial direction when the lens barrel is collapsed. A first lens holding frame holds a first lens, and a second lens holding frame holds a second lens. The first lens holding frame follows a cam groove, which is formed in a cam cylinder, to move in a direction of an optical axis. In a shooting state, the second lens is disposed on the optical axis. In a retracted state, the second lens is disposed at a position retracted outwardly in a radial direction from the center of the optical axis and on a rear surface of the cam cylinder.

6 Claims, 10 Drawing Sheets

ZOOM-TYPE LENS BARREL AND IMAGE PICKUP APPARATUS

BACKGROUND OF THE INVENTION

Field of the Invention

The present invention relates to a zoom-type lens barrel mounted on an image pickup apparatus such as a digital camera, and an image pickup apparatus equipped with the lens barrel.

Description of the Related Art

Some lens barrels mounted on image pickup apparatuses such as digital cameras have a zooming mechanism that varies the shooting angle of view by changing the spacing between a plurality of lenses in a direction of an optical axis. For lens barrels of this type, due to demands for higher zoom rate and thinner cameras, a lens group is required to be increased in stroke to the extent possible and the lens barrel is required to be miniaturized in the direction of the optical axis.

Accordingly, when a lens barrel is to collapsed, some of lenses in a lens barrel are retracted outwardly in a radial direction from a center of the optical axis to increase zoom rate and slim down the lens barrel, and by extension a camera (see Japanese Laid-Open Patent Publication (Kokai) No. 2008-46504 and Japanese Laid-Open Patent Publication (Kokai) No. 2012-58354).

According to Japanese Laid-Open Patent Publication (Kokai) No. 2008-46504, however, because a lens to be retracted when a lens barrel is collapsed is disposed outside other lenses in a radial direction, lens diameter needs to be as small as possible in order to reduce the size of the lens barrel in a radial direction, and this imposes a severe constraint on design. On the other hand, according to Japanese Laid-Open Patent Publication (Kokai) No. 2012-58354, the entire lens to be retracted is rotated to an area outside the lens barrel in a radial direction, and hence upsizing of an image pickup apparatus is inevitable.

SUMMARY OF THE INVENTION

The present invention provides a lens barrel, which is capable of increasing zoom rate and slimming down a lens barrel, and by extension an image pickup apparatus while reducing the size of the lens barrel in a radial direction without decreasing the lens diameter of a lens which retracts outwardly in a radial direction when the lens barrel is collapsed, and an image pickup apparatus having the lens barrel.

Accordingly, a first aspect of the present invention provides a lens barrel comprising a first lens, a second lens configured to be disposed closer to an image plane than the first lens and retractable outwardly in a radial direction from a center of an optical axis of the lens barrel, a first lens holding member configured to hold the first lens, a second lens holding member configured to hold the second lens, and a cam cylinder configured to have a cam groove formed in an inner peripheral portion thereof, the first lens holding member following the cam groove to move in a direction of the optical axis, wherein in a shooting state, the second lens is disposed on the optical axis, and in a retracted state, the second lens is disposed at a position retracted outwardly in the radial direction from the center of the optical axis and on a rear surface of the cam cylinder.

Accordingly, a second aspect of the present invention provides an image pickup apparatus comprising a lens barrel comprising a first lens, a second lens that is disposed closer to an image plane than the first lens and retractable outwardly in a radial direction from a center of an optical axis of the lens barrel, a first lens holding member that holds the first lens, a second lens holding member that holds the second lens, and a cam cylinder that has a cam groove formed in an inner peripheral portion thereof, the first lens holding member following the cam groove to move in a direction of the optical axis, wherein in a shooting state, the second lens is disposed on the optical axis, and in a retracted state, the second lens is disposed at a position retracted outwardly in the radial direction from the center of the optical axis and on a rear surface of the cam cylinder.

According to the present invention, because the size of the lens barrel in the radial direction can be reduced without decreasing the diameter of the lens which retracts outwardly in the radial direction when the lens barrel is collapsed, while zoom rate is increased and the lens barrel, and by extension the image pickup apparatus is slimmed down, the image pickup apparatus can be miniaturized.

Further features of the present invention will become apparent from the following description of exemplary embodiments (with reference to the attached drawings).

DESCRIPTION OF THE EMBODIMENTS

The present invention will now be described with reference to the drawings showing an embodiment thereof.

Figure 1A:
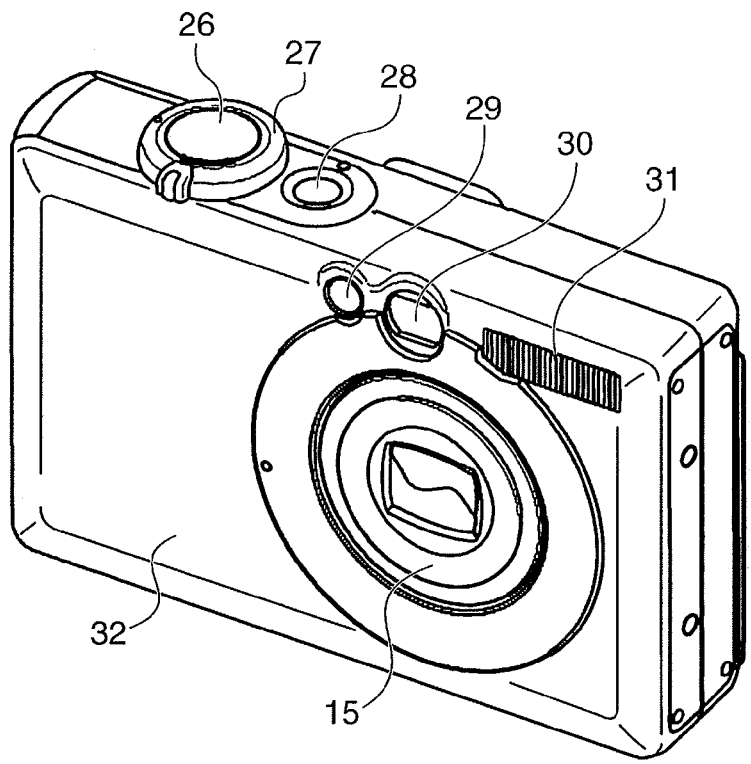
FIG. 1A is a perspective view showing an appearance of a digital camera, which is an exemplary image pickup apparatus having a lens barrel according to the present invention, as viewed from front.
Figure 1B:
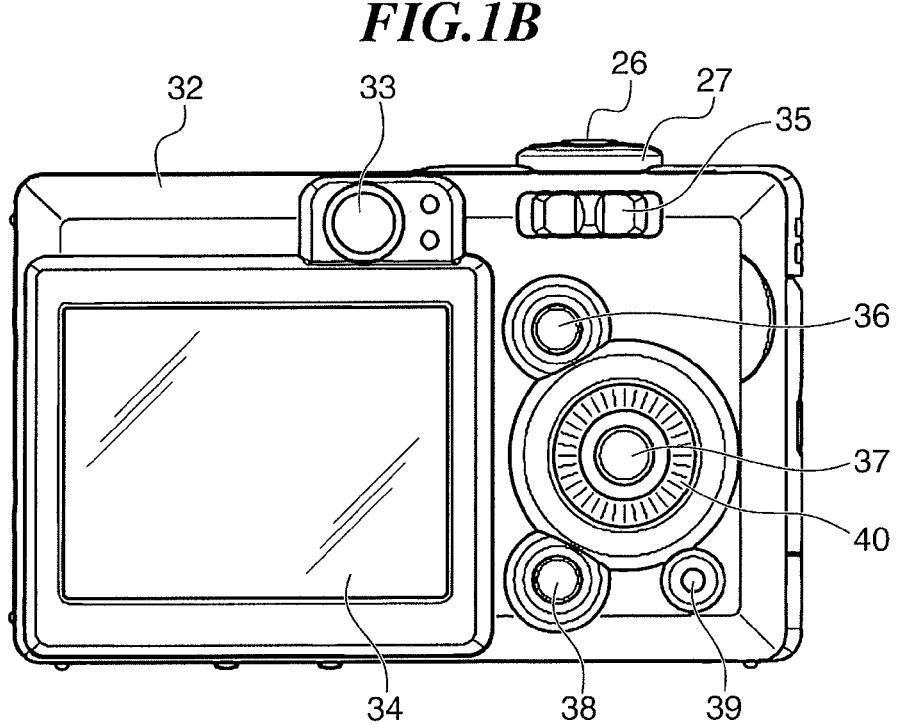
FIG. 1B is a view showing the digital camera in FIG. 1A as viewed from behind.

FIG. 1A is a perspective view showing an appearance of a digital camera, which is an exemplary image pickup apparatus having a lens barrel according to the present invention, as viewed from front, and FIG. 1B is a view showing the digital camera in FIG. 1A as viewed from behind.

Referring to FIG. 1A, in the digital camera according to the present embodiment, a viewfinder 30, which determines a composition of a subject, an auxiliary light source 29, which is for use in performing photometric measurement and distance measurement, an electronic flash 31, and a lens barrel 15 are provided on a front side of a camera body 32. The lens barrel 15 is a zoom type capable of moving between a shooting position and a retracted position in a direction of an optical axis to vary shooting magnification at high rate.

A shutter release button 26, a power selection button 28, and a zoom lever 27 are provided on an upper side of the camera body 32. Referring to FIG. 1B, operation buttons 35 to 40, a display 34 such as an LCD, and a viewfinder eyepiece 33 are provided on a rear side of the camera body 32.

Figure 2:
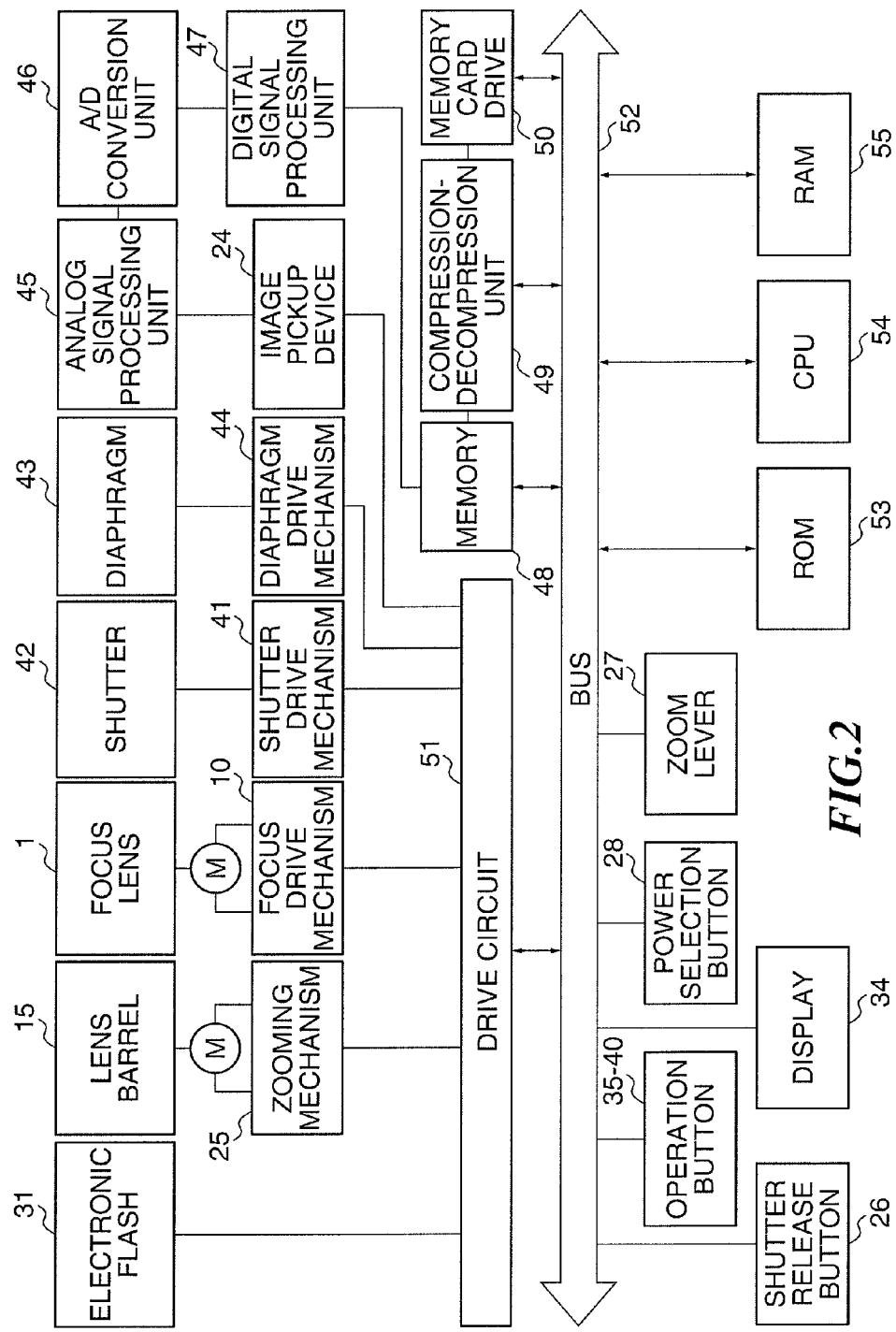
FIG. 2 is a block diagram schematically showing a control system of the digital camera.

FIG. 2 is a block diagram schematically showing a control system of the digital camera according to the present embodiment. Referring to FIG. 2, a CPU 54, a ROM 53, a RAM 55, a memory 48, a compression-decompression unit 49, a memory card drive 50, the display 34, and a drive circuit 51 are connected to a bus 52. Also, switches such as the shutter release button 26, the operation buttons 35 to 40, the power selection button 28, and the zoom lever 27 are connected to the bus 52.

A zooming mechanism 25 which zoom-drives the lens barrel 15, a focus drive mechanism 10 which drives a focus lens (retractable lens) 1, a shutter drive mechanism 41 which drives a shutter 42, and a diaphragm drive mechanism 44 which drives a diaphragm 43 are connected to the drive circuit 51.

An image pickup device 24 such as a CCD sensor or a CMOS sensor, on which light from a subject forms an image after passing through a shooting optical system, and the electronic flash 31 are also connected to the drive circuit 51. Operation of each unit connected to the drive circuit 51 is controlled via the drive circuit 51 based on signals from the CPU 54.

Various control programs and others are stored in the ROM 53, and data required for various control programs is stored in the RAM 55. An analog signal processing unit 45 carries out analog processing on image data output from the image pickup device 24 and outputs the image data to an A/D conversion unit 46.

The A/D conversion unit 46 converts analog data, which is taken from the image pickup device 24, to digital data and outputs the digital data to a digital signal processing unit 47. The digital signal processing unit 47 carries out predetermined processing on digital data obtained as a result of conversion by the A/D conversion unit 46 and outputs the digital data as image data to the memory 48.

Image data stored in the memory 48 is subjected to a compression process such as JPEG or TIFF by the compression-decompression unit 49 and then output to and stored in a memory card inserted in the memory card drive 50.

Image data stored in the memory 48 and image data stored in the memory card are subjected to a decompression process by the compression-decompression unit 49 and then displayed on the display 34 via the bus 52. When seeing an image displayed on the display 34 and determining that the image is unnecessary, a user can delete the image by operating the operation button 36.

Figure 3:
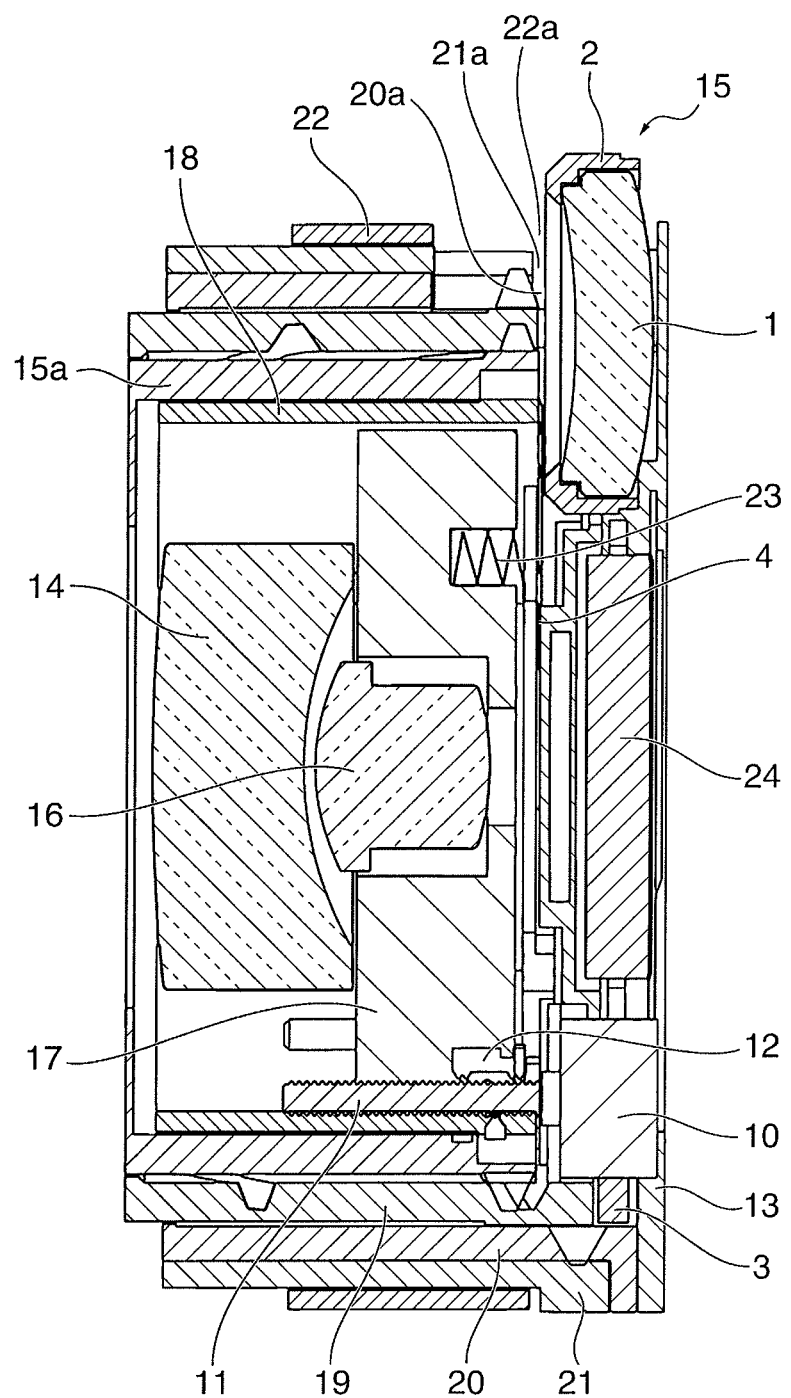
FIG. 3 is a cross-sectional view showing a lens barrel at a retracted position.
Figure 4:
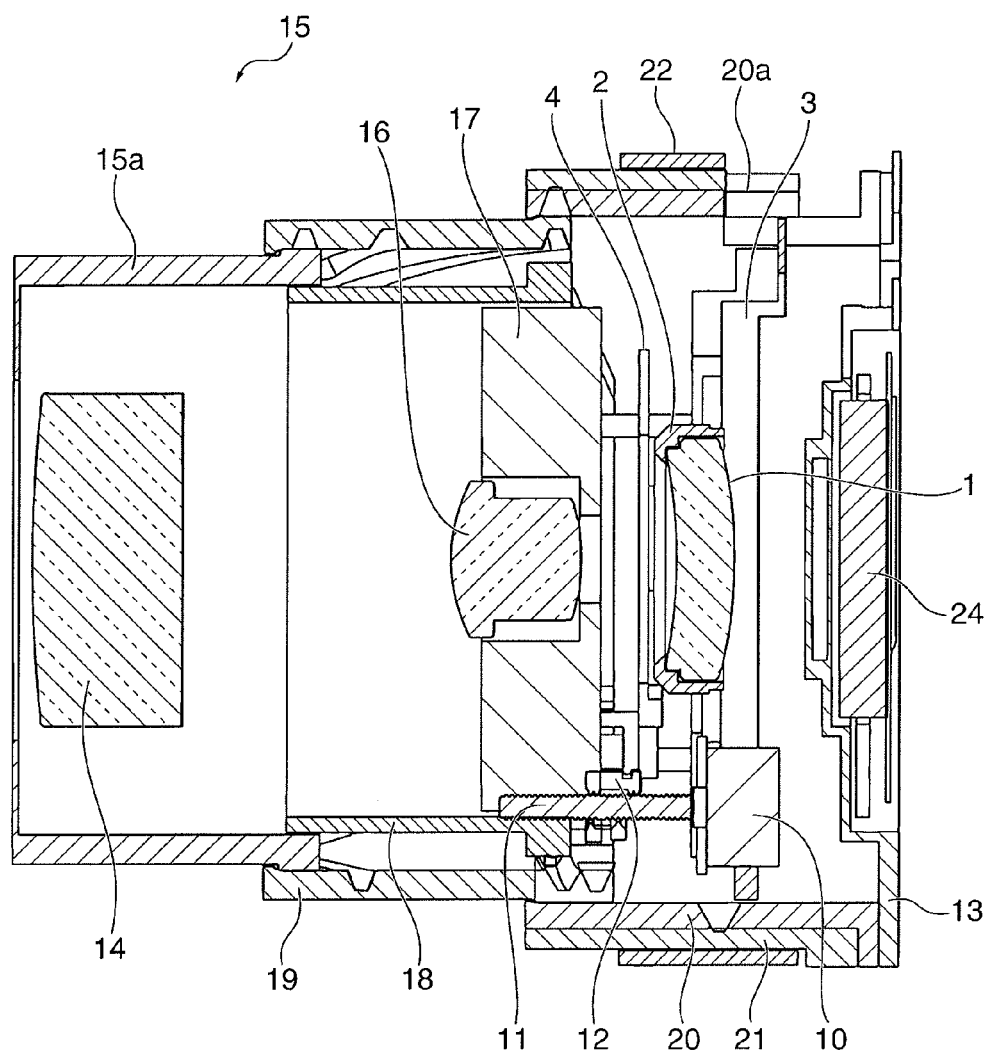
FIG. 4 is a cross-sectional view showing the lens barrel at a shooting position.
Figure 5:
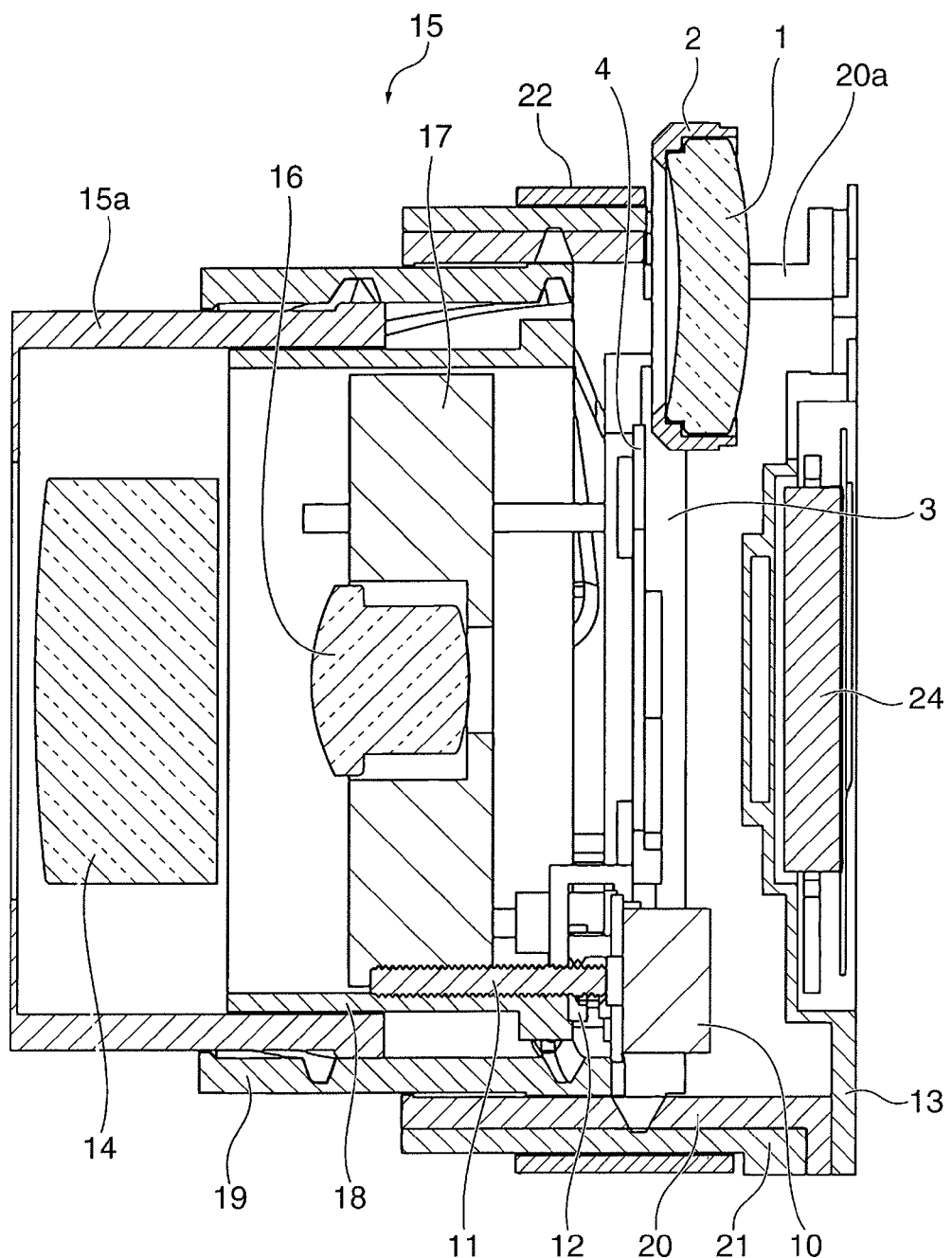
FIG. 5 is a cross-sectional view showing the lens barrel at an intermediate position.

Referring next to FIGS. 3 to 10, a detailed description will be given of the lens barrel 15. FIG. 3 is a cross-sectional view showing the lens barrel 15 at a retracted position, FIG. 4 is a cross-sectional view showing the lens barrel 15 at a shooting position, and FIG. 5 is a cross-sectional view showing the lens barrel 15 at an intermediate position (between the retracted position and the shooting position).

Referring to FIGS. 3 to 5, the lens barrel 15 has a shooting optical system comprised of a first lens 14, a second lens 16, and the retractable lens 1. A second lens holding frame 17 holding the second lens 16 is disposed on a rear side (image plane side) of a first lens holding frame 15a holding the first lens 14. A retractable lens holding frame 2 is disposed on an image plane side of the second lens 16, and the retractable lens 1 constituting the focus lens is held in the retractable lens holding frame 2.

The image pickup device 24 is disposed on an image plane side of the retractable lens 1 and held in a device holding frame 13.

A moving cam cylinder 19 is disposed on an outer peripheral side of the first lens holding frame 15a, and a straight advance cylinder 18 is disposed on an inner peripheral side of the first lens holding frame 15a. The moving cam cylinder 19 and the straight advance cylinder 18 are bayonet-coupled to each other, and the moving cam cylinder 19 is capable of moving integrally with the straight advance cylinder 18 in the direction of the optical axis while rotating.

A fixed cam cylinder 20 is disposed on an outer peripheral side of the moving cam cylinder 19. A drive cam cylinder 21 is disposed on an outer peripheral side of the fixed cam cylinder 20, and a holding cylinder 22 is disposed on an outer peripheral side of the drive cam cylinder 21.

When the drive cam cylinder 21 is rotated by power transmitted from the zooming mechanism 25, rotative force of the drive cam cylinder 21 rotates the moving cam cylinder 19. The moving cam cylinder 19 moves in the direction of the optical axis while rotating by following a cam groove formed in an inner peripheral portion of the fixed cam cylinder 20. At this time, the straight advance cylinder 18 moves integrally with the moving cam cylinder 19 in the direction of the optical axis, and the straight advance cylinder 18 moves in the direction of the optical axis while being inhibited from rotating by the fixed cam cylinder 20.

The first lens holding frame 15a and the second lens holding frame 17 move in the direction of the optical axis by following respective cam grooves having different cam paths formed in an inner peripheral portion of the moving cam cylinder 19 while being inhibited from rotating by the straight advance cylinder 18.

Figure 6:
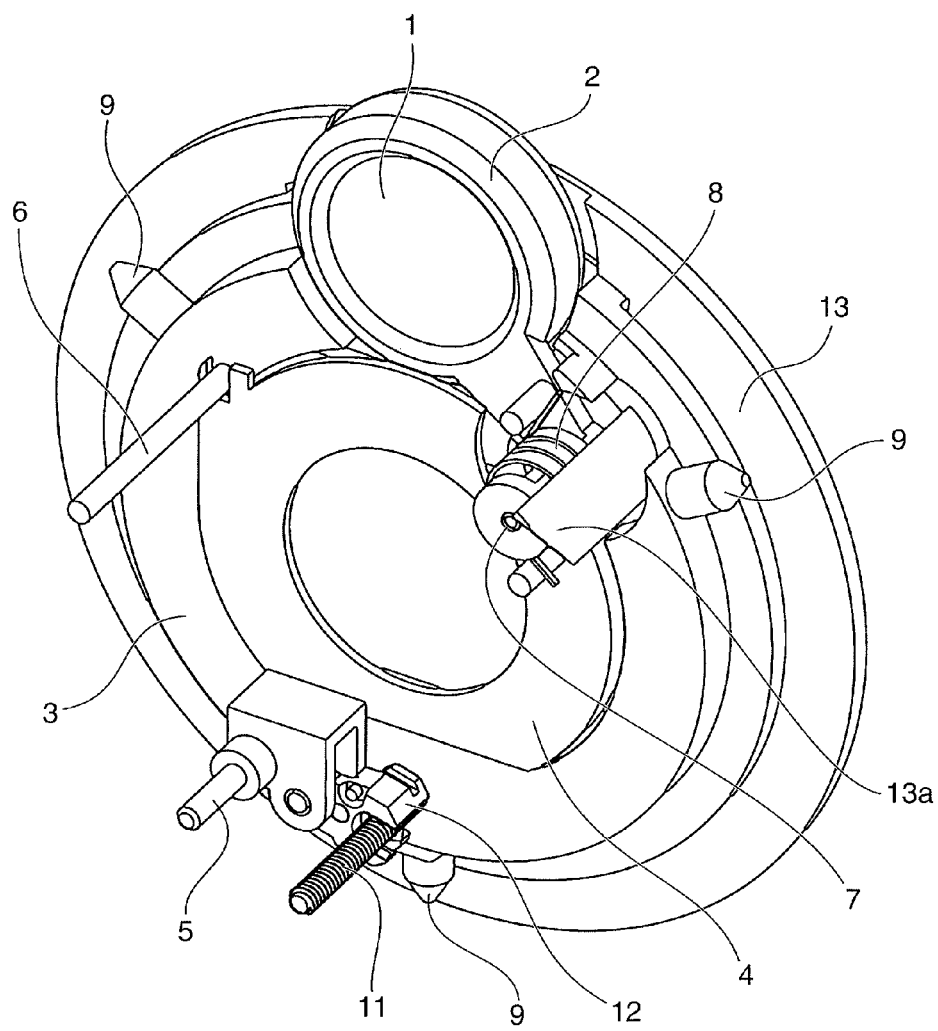
FIG. 6 is a perspective view which is useful in explaining a state of a retractable lens when the lens barrel is at the retracted position.
Figure 7:
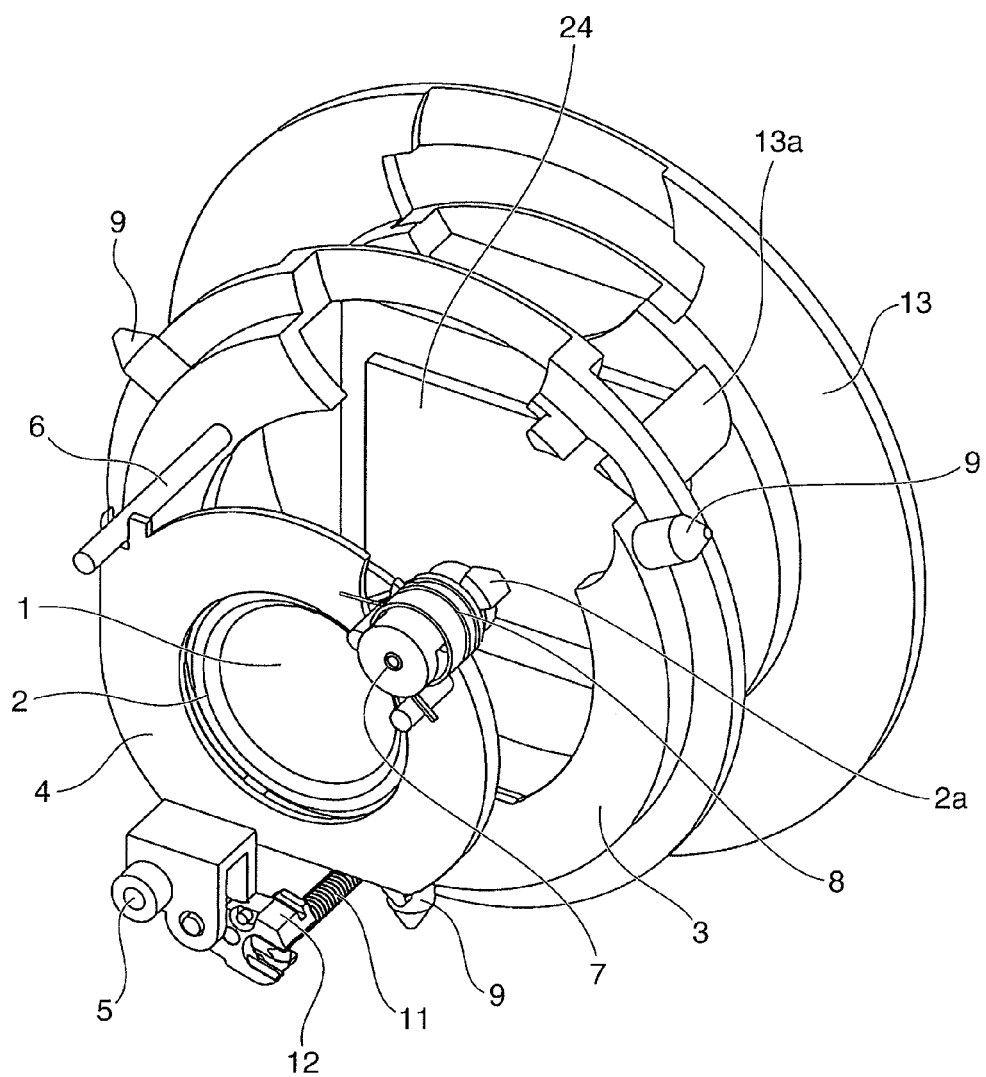
FIG. 7 is a perspective view which is useful in explaining a state of the retractable lens when the lens barrel is at the shooting position.

FIG. 6 is a perspective view which is useful in explaining a state of the retractable lens 1 when the lens barrel 15 is at the retracted position (FIG. 3). FIG. 7 is a perspective view which is useful in explaining a state of the retractable lens 1 when the lens barrel 15 is at the shooting position (FIG. 4).

Referring to FIGS. 6 and 7, a moving member 3 is disposed on a subject side of the device holding frame 13, and a moving base member 4 is disposed on a subject side of the moving member 3. The moving base member 4 is provided with a rotary shaft 7 parallel with the optical axis.

The retractable lens holding frame 2 is supported by the rotary shaft 7 so as to be rotatable on an image plane side of the moving base member 4 and between a position at which the retractable lens 1 is disposed at the center of the optical axis (FIG. 7) and a position at which the retractable lens 1 retracts outwardly in a radial direction from the center of the optical axis (FIG. 6). The retractable lens holding frame 2 is urged by a torsion spring 8 in such a direction that the retractable lens 1 is held at the center of the optical axis with respect to the moving base member 4.

A plurality of followers 9 projecting outwardly in a radial direction is provided in an outer peripheral portion of the moving member 3. The moving member 3 is caused to move in the direction of the optical axis by the followers 9 following respective cam grooves formed in an inner peripheral portion of the drive cam cylinder 21. On this occasion, the moving member 3 moves in the direction of the optical axis while being inhibited from rotating by the fixed cam cylinder 20.

The moving member 3 is provided with an actuator 10 (see, for example, FIG. 3) such as a stepping motor, which is a focus drive mechanism. A lead screw 11 is extended from the actuator 10 toward a subject so as to be parallel with the optical axis. A nut 12 is engaged with the lead screw 11 and held by the moving base member 4. Two guide bars 5 and 6, which guide the moving base member 4 in the direction of the optical axis, are extended from the moving member 3 toward a subject so as to be parallel with the optical axis.

Driving the actuator 10 when the lens barrel 15 is at the shooting position as shown in FIG. 7 causes the lead screw 11 to rotate, and engagement of the lead screw 11 and the nut 12 causes the moving base member 4 to move in the direction of the optical axis. As a result, with the retractable lens 1, i.e. the focus lens held at the center of the optical axis, the retractable lens holding frame 2 moves integrally with the moving base member 4 in the direction of the optical axis to perform a focusing operation.

Figure 8:
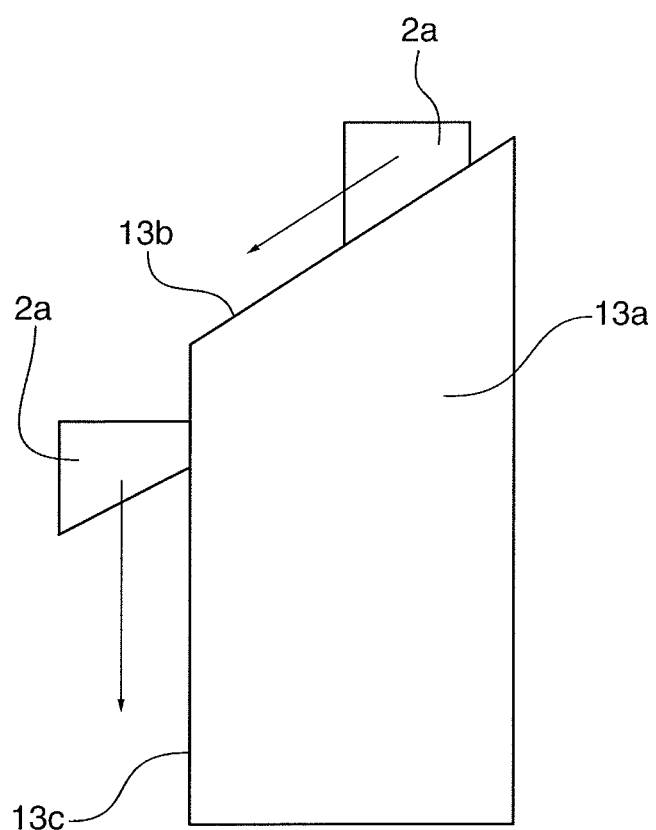
FIG. 8 is a diagram schematically showing the relationship between a retracting lever and a to-be-retracted lever.

The device holding frame 13 disposed on the image plane side of the retractable lens 1 is provided with a retracting lever 13a, and the retractable lens holding frame 2 is provided with a to-be-retracted lever 2a. As the lens barrel 15 is collapsed, the retracting lever 13a gives rotative force to the to-be-retracted lever 2a, causing the retractable lens holding frame 2 to rotate from the position at which the retractable lens 1 is disposed at the center of the optical axis (FIG. 7) to the position at which the retractable lens 1 retracts outwardly in the radial direction from the center of the optical axis (FIG. 6). Referring to FIG. 8, a detailed description will be given of how the retractable lens holding frame 2 rotates at this time.

FIG. 8 is a diagram schematically showing the relationship between the retracting lever 13a and the to-be-retracted lever 2a. Referring to FIG. 8, a first cam surface 13b and a second cam surface 13c which the to-be-retracted lever 2a follows are formed in the retracting lever 13a. The first cam surface 13b is sloped in a direction that intersects the optical axis, and the second cam surface 13c is parallel to the optical axis.

As the lens barrel 15 is collapsed, the to-be-retracted lever 2a comes into contact with the first cam surface 13b of the retracting lever 13a and follows the first cam surface 13b, and as a result, cam engagement of the to-be-retracted lever 2a and the first cam surface 13b causes the retractable lens holding frame 2 to rotate in a retracting direction. This state corresponds to the retracting state shown in FIG. 5.

Thereafter, the to-be-retracted lever 2a finishes following the first cam surface 13b and moves along the second cam surface 13c toward the retracted position in the direction of the optical axis. It is thus unnecessary to rotate the retractable lens holding frame 2 by driving force of the actuator 10, and hence the actuator 10 which is relatively small can be used. It should be noted that when the lens barrel 15 is to move from the retracted position to the shooting position, the operation described above is reversed.

Here, when the to-be-retracted lever 2a follows the first cam surface 13b, a force that causes the retracting lever 13a to push the retractable lens holding frame 2 and lifts the moving base member 4 toward a subject is generated. This lifting of the moving base member 4 is conspicuous in a part supported by the guide bar 6.

Accordingly, in the present embodiment, the second lens holding frame 17 disposed on the subject side of the moving base member 4 is provided with a spring member 23 (FIG. 3), which urges the moving base member 4 toward an image plane when the lens barrel 15 is collapsed, so that the moving base member 4 can be prevented from lifting toward a subject.

Figure 9:
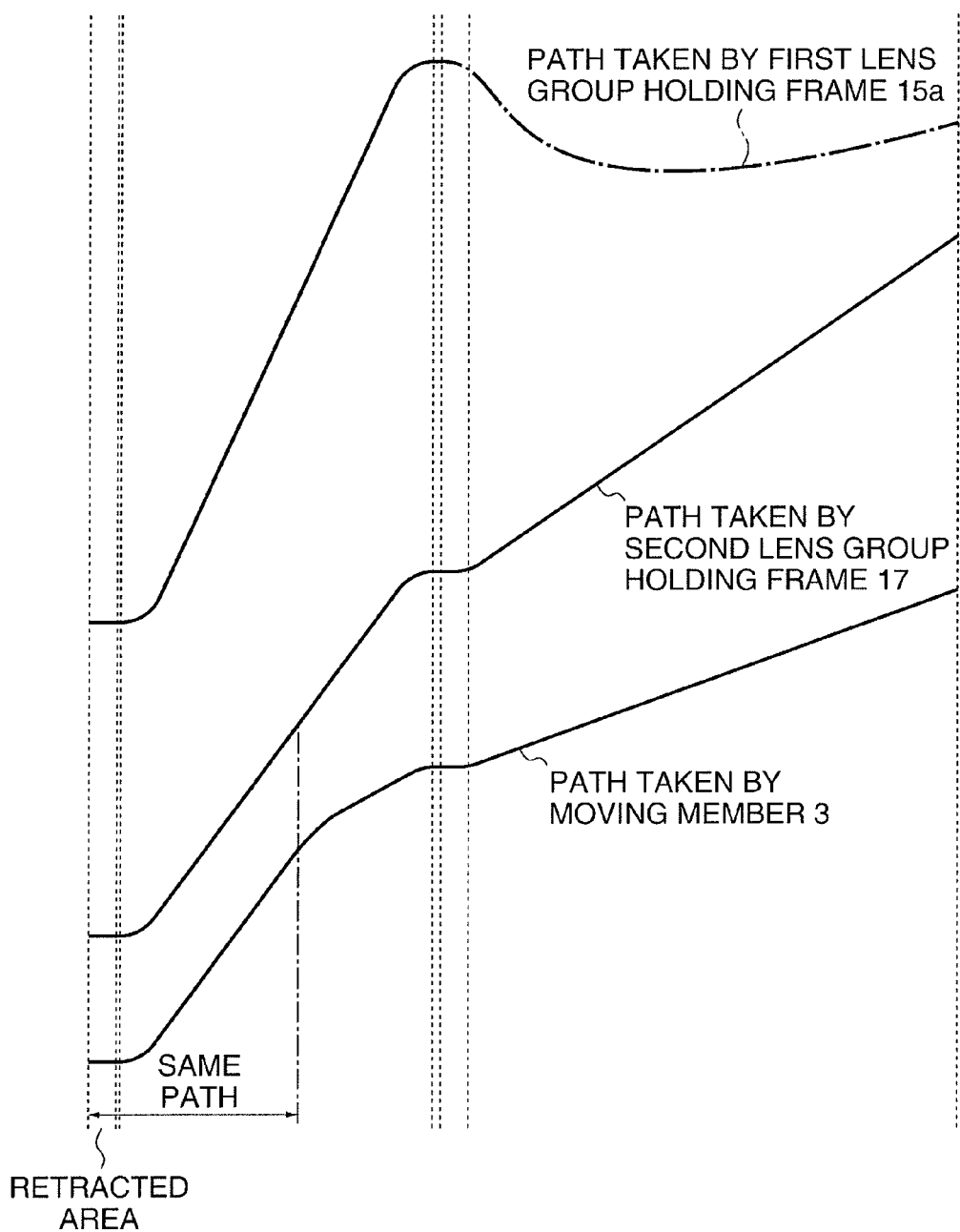
FIG. 9 is a diagram schematically showing paths taken in a direction of an optical axis by a first lens holding frame, a second lens holding frame, and a moving member.

FIG. 9 is a diagram schematically showing paths taken in the direction of the optical axis by the first lens holding frame 15a, the second lens holding frame 17, and the moving member 3.

Referring to FIG. 9, when the lens barrel 15 is to be collapsed, the moving member 3 and the second lens holding frame 17 move in the direction of the optical axis while taking substantially the same path in a state of being close to each other. In the present embodiment, before the to-be-retracted lever 2a comes into contact with the retracting lever 13a, the moving member 3 and the second lens holding frame 17 take substantially the same path in a state of being close to each other.

As a result, the spacing between the moving base member 4, which is held by the moving member 3, and the second lens holding frame 17 in the direction of the optical axis can be kept constant. Thus, by keeping this spacing narrow, the second lens holding frame 17 can prevent the moving base member 4 from lifting toward a subject.

When the lens barrel 15 is to move from the shooting position to the retracted position, first, the actuator 10 is driven to move the retractable lens holding frame 2 toward an image plane in the direction of the optical axis. At this time, the retracting lever 13a gives rotative force to the to-be-retracted lever 2a, causing the retractable lens holding frame 2 to rotate to the retracted position.

After that, rotation of the drive cam cylinder 21 causes the moving member 3 to perform a collapsing operation, and in response to this operation, the retractable lens holding frame 2 moves parallel with the optical axis to the retracted position in FIG. 3. As a result, the lens barrel 15 is collapsed.

On this occasion, at the retracted position, the retractable lens holding frame 2 is disposed outside a short-side side surface (an upper side surface in FIG. 3) of the image pickup device 24, and a subject side of the retractable lens holding frame 2 in the direction of the optical axis is covered with the moving cam cylinder 19 and the fixed cam cylinder 20.

Figure 10:
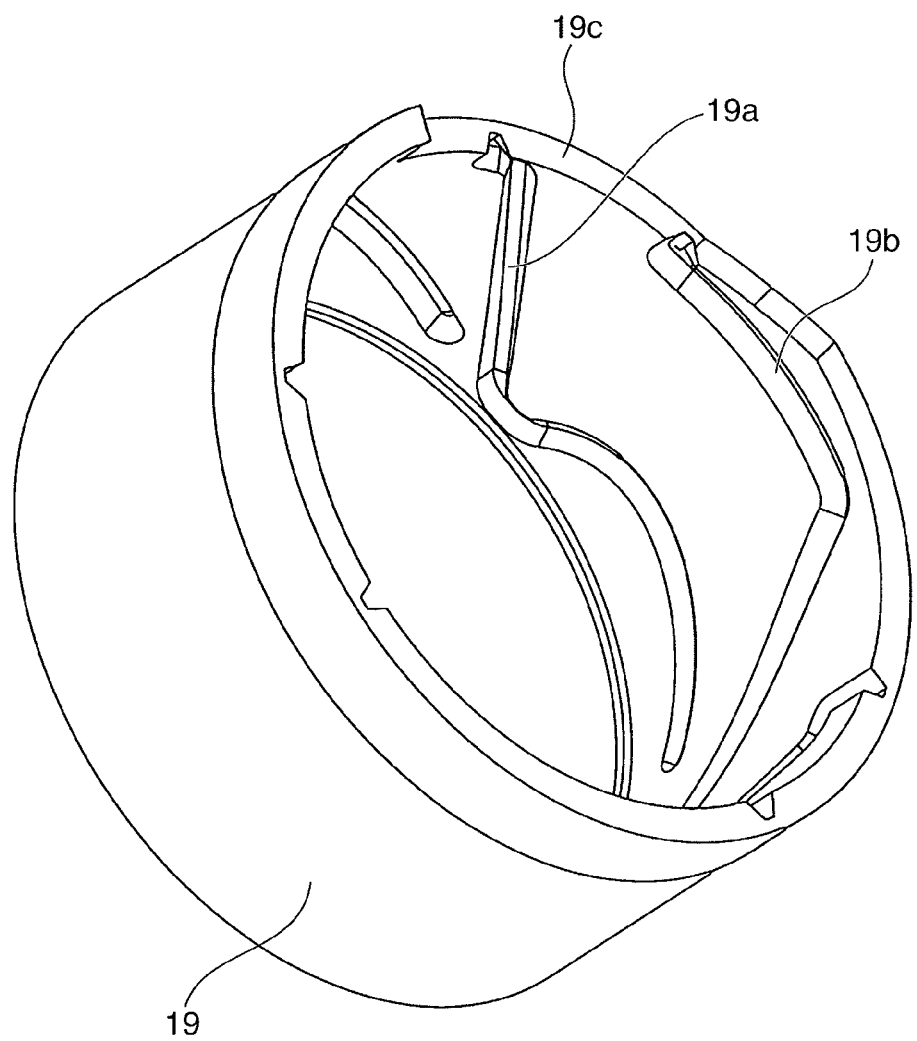
FIG. 10 is a perspective view showing a moving cam cylinder.

FIG. 10 is a perspective view showing the moving cam cylinder 19. Referring to FIG. 10, a first cam groove 19a, which the first lens holding frame 15a follows in the direction of the optical axis, and a second cam groove 19b, which the second lens holding frame 17 follows in the direction of the optical axis, are formed in an inner peripheral portion of the moving cam cylinder 19.

At an image plane side end of the moving cam cylinder 19, a cutaway portion 19c is formed on an image plane side of an area where the first lens holding frame 15a in a cam path of the first cam groove 19a is retracted and an area where the second lens holding frame 17 in a cam path of the second cam groove 19b is retracted.

Also, referring to FIG. 3, a cutaway portion 20a is formed at an image plane side end of the fixed cam cylinder 20, a cutaway portion 21a is formed at an image plane side end of the drive cam cylinder 21, and a cutaway portion 22a is formed at an image plane side end of the holding cylinder 22.

With the lens barrel 15 being at the retracted position, the retractable lens holding frame 2 retracted outwardly in the radial direction from the optical axis is inserted into the cutaway portions 19c, 20a, 21a, and 22a, and in the present embodiment, part of the retractable lens holding frame 2 projects from an outer peripheral portion of the lens barrel 15.

In this state, inside the camera main body 32, the retractable lens holding frame 2 is disposed in a space surrounded by the short-side side surface of the image pickup device 24, rear surfaces of the cam cylinders 19, 20, and 21, and the display 34 provided on the rear surface of the camera body 32. Namely, in this state, the retractable lens holding frame 2 is disposed closer to an image plane than the cam cylinder 19 and covered with the cam cylinder 19 as viewed from a subject. Therefore, even if the diameter of the retractable lens holding frame 2, that is, the diameter of the retractable lens 1 is increased, an increase in the size of the lens barrel 15 in the radial direction can be avoided.

As described above, according to the present embodiment, when a lens barrel is collapsed, the size of the lens barrel 15 in the radial direction can be reduced without decreasing the lens diameter of the retractable lens 1 retracting outwardly in the radial direction, while zoom rate is increased, and the lens barrel 15, and by extension the digital camera is slimmed down. This leads to further miniaturization of the digital camera.

It should be noted that although in the present embodiment, a stepping motor is used as an example of the actuator 10, a voice coil motor may be used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-084761 filed Apr. 15, 2013, which is hereby incorporated by reference herein in its entirety.

What is claimed is:

1. A lens barrel comprising:
a first lens;
a second lens configured to be disposed closer to an image plane than said first lens and retractable outwardly in a radial direction from a center of an optical axis of the lens barrel;
a first lens holding member configured to hold the first lens;
a second lens holding member configured to hold the second lens, wherein the first lens holding member is disposed on a subject side of said second lens holding member;
a moving base member configured to hold said second lens holding member and be movable in a direction of an optical axis in conjunction with said second lens holding member;
a drive mechanism configured to cause said second lens holding member to move between a position on an optical axis of a shooting optical system and a position outside the optical axis;
and
a cam cylinder configured to have a cam groove formed in an inner peripheral portion thereof, said first lens holding member following the cam groove to move in the direction of the optical axis by cam-engaging with said first lens holding member,
wherein in a shooting state, said second lens is disposed on the optical axis,
wherein in a retracted state, said drive mechanism causes said second lens holding member to retract from the position on the optical axis to the position outside the optical axis while holding said moving base member on the position on the optical axis, and causes said second lens holding member to move to a rear side of said cam cylinder on the position outside the optical axis, and
wherein in the retracted state, said second lens holding member is inserted into a cutaway portion formed at an end in the rear side of said cam cylinder, a part of said second lens holding member projecting outwardly further than an outer surface of the lens barrel in a radial direction of the lens barrel.

2. The lens barrel according to claim 1, further comprising an image pickup device configured to receive a bundle of light having passed through the shooting optical system including said first lens and said second lens,
wherein in the retracted state, as viewed from a direction perpendicular to the optical axis, positions of said moving base member, said drive mechanism and said image pickup device in the direction of the optical axis overlap one another, and
wherein said drive mechanism does not retract to the position outside the optical axis in conjunction with said second lens holding member and does not project outwardly further than the outer surface of the lens barrel in the radial direction of the lens barrel.

3. The lens barrel according to claim 1, further comprising:
an image pickup device disposed on an image plane side of said moving base member; and
an image pickup device holding member configured to hold said image pickup device and have a retracting lever which projects toward said moving base member,
wherein said second lens holding member has a to-be-retracted lever which causes said second lens holding member to retract to the position outside the optical axis by being given a rotational force by the retracting lever.

4. An image pickup apparatus comprising:
a lens barrel comprising: a first lens, a second lens configured to be disposed closer to an image plane than said first lens and retractable outwardly in a radial direction from a center of an optical axis of the lens barrel, a first lens holding member configured to hold the first lens, a second lens holding member configured to hold the second lens, wherein the first lens holding member is disposed on a subject side of said second lens holding member, a moving base member configured to hold said second lens holding member and be movable in a direction of an optical axis in conjunction with said second lens holding member, a drive mechanism configured to cause said second lens holding member to move between a position on an optical axis of a shooting optical system and a position outside the optical axis, and a cam cylinder configured to have a cam groove formed in an inner peripheral portion thereof, said first lens holding member following the cam groove to move in the direction of the optical axis by cam-engaging with said first lens holding member, wherein in a shooting state, said second lens is disposed on the optical axis, wherein in a retracted state, said drive mechanism causes said second lens holding member to retract from the position on the optical axis to the position outside the optical axis while holding said moving base member on the position on the optical axis, and causes said second lens holding member to move to a rear side of said cam cylinder on the position outside the optical axis, and wherein in the retracted state, said second lens holding member is inserted into a cutaway portion formed at an end in the rear side of said cam cylinder, a part of said second lens holding member projecting outwardly further than an outer surface of the lens barrel in a radial direction of the lens barrel.

5. The image pickup apparatus according to claim 4, further comprising an image pickup device configured to receive a bundle of light having passed through the shooting optical system including said first lens and said second lens, wherein in the retracted state, as viewed from a direction perpendicular to the optical axis, positions of said moving base member, said drive mechanism and said image pickup device in the direction of the optical axis overlap one another, and wherein said drive mechanism does not retract to the position outside the optical axis in conjunction with said second lens holding member and does not project outwardly further than the outer surface of the lens barrel in the radial direction of the lens barrel.

6. The image pickup apparatus according to claim 4, further comprising:

an image pickup device disposed on an image plane side of said moving base member; and an image pickup device holding member configured to hold said image pickup device and have a retracting lever which projects toward said moving base member, wherein said second lens holding member has a to-be-retracted lever which causes said second lens holding member to retract to the position outside the optical axis by being given a rotational force by the retracting lever.

* * * * *